Oct. 12, 1954
A. W. PECK
2,691,358
FERTILIZER FLOW CONTROLLER
Filed Nov. 19, 1951
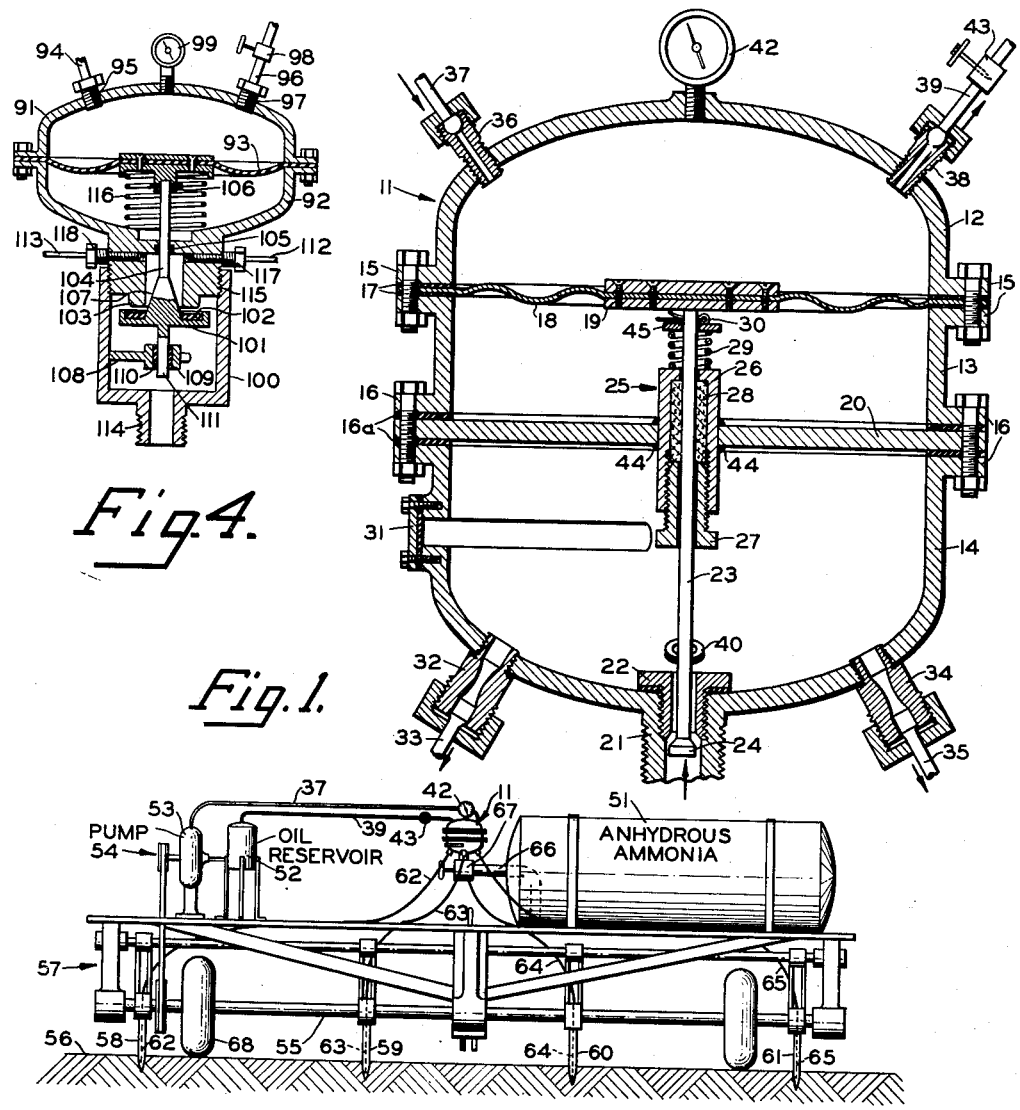
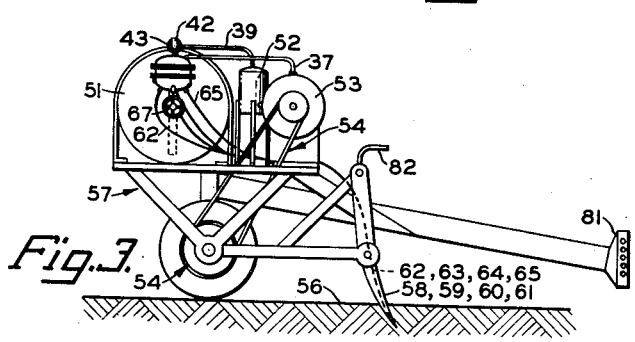
INVENTOR.
A. W. PECK
BY
*Hudson & Young*
ATTORNEYS Patented Oct. 12, 1954

2,691,358

UNITED STATES PATENT OFFICE 2,691,358

FERTILIZER FLOW CONTROLLER

Alvin W. Peck, Bartlesville, Okla., assignor to Phillips Petroleum Company, a corporation of Delaware Application November 19, 1951, Serial No. 257,151

5 Claims. (Cl. 111—7)

This invention relates to an apparatus for injecting fluid fertilizer into soil. In one aspect it relates to an apparatus for regulating the flow of fluid fertilizer materials into the soil. In another aspect it relates to an apparatus for regulating the flow of fluid fertilizer into the soil and for promptly cutting off and starting the flow of fluid when the apparatus upon which the distributor system is mounted is stopped and started, respectively.

In tractor-mounted liquid fertilizer distributing equipment where the controls are in reach of the operator, the operator may cut off the flow of liquid fertilizer at the instant the tractor is stopped so that there will not be a continued flow of liquid with its resultant loss and overdosage. In large fertilizer distributing assemblies wherein the fertilizer distributor is a tractor drawn assembly the tractor operator upon bringing the tractor to a halt, must dismount from the tractor and walk to the distributor apparatus and turn a valve in order to stop the flow of liquid fertilizer. During this time interval liquid fertilizer is continuing to flow and to be injected into the ground at one point. This fertilizer which flows during this interval of time is of course a loss. And further, the continued injection of fertilizer into the ground during this interval of time in which the apparatus is not moving, overfertilizes the soil at this point with the result that many crops in the immediate vicinity of the overinjections will be burned.

One object of my invention is to devise an apparatus which is adaptable to stop the flow of fertilizer simultaneously with the halting of the apparatus. Another object of my invention is to devise an apparatus for the prevention of loss of liquid fertilizer during the starting and stopping operations. Another object of my invention is to devise an automatic fertilizer distributing apparatus which prevents overinjections of liquid fertilizer into the soil during periods of starting and stopping of the apparatus.

I have devised an apparatus which accomplishes the above mentioned and other objects in that the liquid fertilizer feeding apparatus closes off immediately upon stopping of the vehicle upon which the apparatus is mounted and starts the feeding operation immediately upon starting of the vehicle. In my apparatus an oil pressure assembly controls a feed valve for opening and closing the flow of fertilizer upon starting and stopping of the apparatus.

In the drawing, Figure 1 is a diagrammatic elevational view, partly in section, illustrating the distributing flow controller of my invention. Figure 2 is a vertical elevational view of a 4-row liquid fertilizer distributor assembly mounted on a 2-wheel vehicle. Figure 3 is a side view of the apparatus of Figure 2. Figure 4 is a sectional view of a preferred embodiment of my invention.

Referring now to the drawing and specifically to Figure 1, this distributor flow controller 11 is broadly a cylindrical vessel containing three compartments. The upper compartment is bounded by a housing or shell 12, and a diaphragm 18. The lower compartment is bounded by a shell 14 and a rigid partition plate 20. The center compartment is bounded by a ring 13, the diaphragm 18 and the partition plate 20. The housing 12 and the ring 13 are held together by bolted flanges 15. Within this joint is disposed the diaphragm 18. On either side of the diaphragm 18 are disposed gaskets 17 so as to make the upper and center compartments fluid tight. This upper compartment is provided with a pressure gauge 42 and two pipe connections 36 and 38. To the connection 36 is attached a tube or pipe 37 while tube 39 is attached to the connections 38. Tube 39 is provided with a needle valve 43. The lower section 14 of this generally cylindrical vessel is attached to the ring 13 by the bolted flanges 16. Between these flanges 16 is mounted the rigid partition plate 20 carrying gaskets 16a so that the bolted flanges 16 provide fluid tight connections with the plate 20. In the bottom of this lower section 14 is provided a valved pipe connection 21. On the inside of this pipe connection 21 is a bushing 22 which serves as a seat for valve 24. The stem 23 of this valve 24 extends upward through a packing gland assembly 25 and terminates in substantial contact with the plate element 19 of the diaphragm 18. This packing gland assembly 25 is composed of a shell 26, packing 28 and a take-up nut 27. A bolted plate 31 is provided around a portion of the periphery of element 14 to provide access for adjustment of the take-up nut 27 and bushing 22. The packing shell 26 is attached rigidly to the partition plate 20 by welds 44 in such a manner that the joint between the shell 26 and the plate 20 is fluid-tight. At the upper end of the valve stem 23 is a key 30 inserted through the end of the valve stem 23. Immediately under this pin 30 is a washer 45 to hold a compression spring 29 on the top of shell 26. This compresison spring tends to bias the valve head 24 in a closed position when no downward presure is being exerted on diaphragm 18. This diaphragm 18 and diaphragm plate 19 are so intended to operate that when fluid pressure is exerted in housing 12 the diaphragm and plate will be moved slightly in a downward direction against the end of the valve stem 23 to cause the valve head 24 to open.

Tube 37 is an oil inlet tube for the introduction of oil under pressure into the space above the diaphragm 18. Tube 39 is for the flow of oil from this space. The needle valve 43 is for adjustment or restriction of the flow of oil through tube 39 so as to maintain a given or predetermined oil pressure in this upper compartment. Tubes 33 and 35 are fertilizer distributor tubes for carrying liquid fertilizer from this distributing element to points of injection into the soil. Opening 40 and a similar opening in the cut-away half of Figure 1 are additional openings for insertion of tube connections similar to elements 32 and 34 for transmission of liquid fertilizer to additional points of fertilizer injection in case a 4-pint injection apparatus is used. Elements 32 and 34 are preferably metering elements and they are so chosen that the diameter of the conduits therethrough permit the desired rate of flow of fertilizer. In case soil is being fertilized which is quite deficient in nitrogen these elements 32 and 34 should contain metering orifices of larger diameter than when soil to be fertilized requires less nitrogen and needs only a slight fertilizer treatment.

This distributing flow controller assembly is intended to operate in such a manner that when the vehicle upon which it is mounted starts to move oil enters the upper chamber through tube 37 and exit from this chamber is restricted by the needle valve 43 in such a manner that a predetermined pressure is maintained in this compartment. This pressure forces the plate 19 downward against the upper end of the valve stem 23 and compresses the compression spring 29 to open the valve 24. The pipe connection 21 carrying the valve 24 is attached to a source of supply of liquid fertilizer. When the valve 24 is open liquid fertilizer flows around valve 24 into the lower distributor compartment and the fertilizer then flows out through the several distributor tubes 33 and 35. When the vehicle upon which this assembly is mounted is stopped oil ceases to enter into the upper chamber through the line 37 and the needle valve 43 permits instant reduction of pressure with the result that compression spring 29 lifts the valve stem 23 to close the valve 24 to further inlet of fluid. Thus the apparatus is closed to the further flow of liquid fertilizer. In constructing such an apparatus as illustrated in Figure 1 the apparatus is relatively small and the actual volume of liquid fertilizer contained in the lower and distributing compartment is very, very small.

Referring now to Figure 2 of the drawing there is illustrated a two-wheeled vehicle mounting my liquid distributor system. The liquid fertilizer, such as anhydrous ammonia, is stored in a pressure tank 51. A liquid outlet line 66 conducts liquid from this pressure tank to the bottom of the distributor control element 11 around the valve 24 as shown in Figure 1. Manually operable valve 67 is shown in line 66 so that the liquid may be closed off at such times when the apparatus is not in use, for example, during an overnight period. Element 52 is an oil reservoir which supplies oil to a pressure pump 53. Oil from the pump 53 flows through the line 37 into the top section of the distributor element 11.

Oil from this distributor returns through line 39 to the reservoir 52. The needle valve 43 as mentioned hereinbefore is intended to throttle the flow of oil through tube 39 so as to provide oil pressure in the upper compartment of element 11. The oil pressure pump 53 is operated by a take-off assembly 54 which is operated by the shaft 55 from a wheel 68 of the vehicle. This take-off assembly 54 is illustrated as being a belt driven assembly but it may be a gear driven assembly or other suitable power take-off means. Frame 57 is the frame work assembly of this vehicle and upon this frame work assembly is mounted the several parts of the distributor apparatus. Reference numeral 56 refers to the soil into which the ammonia fertilizer is to be injected. Elements 58, 59, 60 and 61 are shoes of more or less conventional type in the center of which are openings throughout their length. A flexible tube 62 leads from the controller distributor apparatus 11 through the shoe 58. This tube 62 terminates at about the bottom end of the shoe 58 and is below the surface of the ground to be fertilized. Extending through shoe 59 is a corresponding tube 63. In like manner in shoe 60 is provided a tube 64 and in shoe 61 is a corresponding tube 65.

Figure 3 is a side elevational view of the assembly of Figure 2. This side elevation shows the particular positioning of the shoes 58, 59, 60 and 61 and of the corresponding tubes 62, 63, 64 and 65 therein for introduction of fertilizer into the soil. Reference numeral 56 again refers to the soil. A hitch apparatus 81 is for connection of this vehicle to a tractor or other prime mover used for moving this apparatus. Element 82 is a conventional adjustment device the rotation of which lowers the shoes into the ground further or raises them to a shallower depth as desired.

In the apparatus as illustrated and described above I have shown the assembly as a 4-tube injection assembly, that is, 4 rows may be fertilized during on passage of the apparatus. When introducing fertilizer between crop rows which are relatively close together the apparatus may be provided with any desired number of distributor tubes such as tubes 62, 63, 64 and 65. For example there may be provided 12 or 16 shoes with corresponding flexible distributor tubes. For example when fertilizing a wheat field in which the rows of grain are relatively close together such an apparatus containing 16 points of injection may be used. When fertilizing cotton or corn a lesser number of injection points can be used in a vehicle of given width because the rows of such crops are planted farther apart than are wheat rows.

As mentioned above in the explanation of the operation of the distributor control element of Figure 1 when the vehicle stops the pump 53 ceases to furnish oil under pressure to the diaphragm 18 and needle valve 43 permits bleed-off of pressure and the compression spring 29 closes the valve 24 and the loss of fertilizer is eliminated. In like manner when the apparatus is started fluid fertilizer does not pass valve 24 until oil pressure is built up against the diaphragm plate 19 sufficiently to open the valve 24.

In Figure 4 is shown a preferred embodiment of my ammonia distributor apparatus. According to the figure, the housing or body consists of an upper body member 91, a lower body member 92 and a depending valve head housing or case 100. Disposed between the body members is a diaphragm 93, as shown. To the underside of the diaphragm is attached, as by means of a cotter key 106 a valve 104. The lower end 107 of the valve stem is tapered. On the large diameter end of this taper section 107 is a head 101 containing a resilient sealing member 102. Depending from the under side of the valve head is a guide rod 111. Surrounding this guide member 111 is a ring 110 of resilient material which in turn is surrounded by a metal ring 109. Holding this support assembly in its proper relation with respect to the guide rod 111 are some radially disposed arms 108. These arms 108 are attached to the inner walls of the case 100 by any means as desired, as by welding, or etc. The case 100 may be attached to the lower body member 92 by threads 115. An O-ring seal 105 surrounds valve stem 104 to prevent or to minimize leakage of ammonia into the space in the lower housing 92 below the diaphragm 93. The bottom of the lower housing member 92 is so shaped as to serve as a seat 103 against which the resilient member 102 seats when the diaphragm and valve are raised by a compresison spring 116 when fluid pressure is reduced in the space above the diaphragm 93.

Connected to the upper housing member 91 are a pair of pipe connections 95 and 97. To connection 95 is attached a tube 94 which is equivalent to tube 37 of Figure 1. To connection 97 is attached a tube 96 carrying a needle valve 98, which tube and valve are equivalent, respectively to elements 39 and 43 of Figure 1. A pressure gage 99 is for indication of oil pressure above the diaphragm.

Connections 117 and 118 are metering connections similar to elements 32 and 34 of Figure 1. To connections 117 and 118 are connected tubes 112 and 113, respectively, for conveyance of ammonia from this distributor apparatus to shoe elements similar to 58—61 of Figure 3. Connection 114 is for passage of ammonia from its storage tank to this distributor.

The operation of the apparatus of Figure 4, is in general, similar to the operation of the Figure 1 distributor. Oil under pressure from a reservoir and pump flows through tube 94 and connection 95 into the space above the diaphragm 93. Needle valve 98 in the outlet tube 96 is adjusted to hold a desired working pressure of oil upstream of this valve as indicated on gage 99. When the apparatus is not in operation, i. e., when the mounting vehicle is not traveling there is no pressure above the diaphragm and the compression spring 116 operates to move the diaphragm 93 upward with the resultant closing of the valve 101.

When the vehicle is moving, some oil pressure is registered on the gage 99 according to the adjustment of valve 98. With this valve adjustment maintained fixed, and the vehicle moves at a more rapid rate, a greater pressure is exerted on the diaphragm 93 with the result that the valve 101 is pushed downward farther. The taper section 107 of the valve is then intended to allow passage of more ammonia than when the valve (and taper section) is not depressed to such an extent by the diaphragm. Thus, it is seen that the taper section 107 is intended to throttle the flow of ammonia from its storage tank to this distributor, flow being greater when the vehicle is moving at a faster rate.

The O-ring sealing member 105 is intended to prevent appreciable leakage of ammonia to the under side of the diaphragm. Since the oil above the diaphragm 93 is usually at a temperature above the boiling point of liquid ammonia, free access of the ammonia to the under side of the diaphragm is undesirable. It is preferred that the major portion of the ammonia be injected into the soil as liquid ammonia, and consistent with this preference, there should be as little evaporation of ammonia in the distributor as possible.

The materials of construction of this apparatus may be selected from those commercially available taking into account corrosive properties of the fluid fertilizer being handled. In case liquid ammonia is the liquid fertilizer used ordinary materials of commerce may be used since anhydrous ammonia is not generally corrosive.

While certain embodiments of the invention have been described for illustrative purposes, the invention obviously is not limited thereto.

I claim:

1. A distributing flow controller for distributing fluid from a common source comprising, in combination, a generally cylindrical vessel, a rigid partition plate disposed normal to the axis of said vessel and closer to one end than to the other, a flexible diaphragm disposed normal to the axis of the vessel and closer to the other end than to said one end, a valve seat disposed in said one end of said vessel, a valve having a head and a stem and said head being in operable relation with said seat, an opening in the center of said rigid partition plate, the stem of said valve extending through said opening and terminating in operable contact with said flexible diaphragm, a packing gland surrounding said valve stem, said gland being connected to said rigid partition plate in a fluid-tight manner, a pipe connection surrounding said valve seat and connected to said vessel for inlet of fluid to be distributed, a plurality of distributor pipe connections in said vessel between the inlet pipe connection and said rigid partition plate, each of said distributor pipe connections having an orifice of suitable size to control the flow of fluid therethrough, a pair of pipe connections in the other end of said vessel and a compression spring biasing said valve in a closed position with respect to its seat.

2. A distributing flow controller for distributing fluid from a common source comprising, in combination, a liquid-tight vessel, a flexible diaphragm disposed normal to the axis of the vessel, a valve seat disposed near one end of said vessel, a valve having a head and a stem and said head being in operable relation with said seat, the stem of said valve terminating in operable contact with said flexible diaphragm, a pipe connection connected to the valve end of said vessel and surrounding said valve seat for inlet of fluid to be distributed, a plurality of distributor pipe connections in said vessel between said valve and said flexible diaphragm, each of said distributor pipe connections having an orifice of suitable size to control the flow of fluid therethrough, a pair of pipe connections in the other end of said vessel and a compression spring biasing said valve in a closed position with respect to its seat.

3. An implement-mounted dispensing system for the direct application of ammonia to soil comprising, in combination, a wheeled vehicle adapted to travel along the ground, a cultivator shoe attached to said vehicle, said shoe being adapted at its lower extremity to produce a furrow in the ground as the vehicle is moved forward, a liquid ammonia storage tank rigidly mounted on said vehicle, a normally closed diaphragm operated valve assembly having a fluid inlet connection and a fluid outlet connection and a flexible diaphragm, a valve seat within said fluid inlet connection, a conduit attached to said fluid inlet connection and leading from said ammonia storage tank, a valve having a head and a stem, said head being disposed in operable relation with respect to said seat within said fluid inlet connection and said stem being operably attached to said diaphragm for imparting movement to said valve head, a tube leading from the outlet connection of said valve to a point near the lower extremity of said shoe for applying ammonia to the soil, an oil storage reservoir and an oil pump mounted on said vehicle, a conduit leading from said oil storage reservoir to the inlet side of said pump, a conduit leading from the pressure outlet side of said pump to the diaphragm valve assembly on the side of the diaphragm opposite the valve stem, the diaphragm being adapted to open said valve upon a predetermined oil pressure from said pump, a power take-off on said vehicle for operating said pump when the vehicle is moving in a forward direction, and an oil return line from the diaphragm valve assembly on the side of the diaphragm opposite said valve stem to the oil storage reservoir.

4. An implement-mounted dispensing system for the direct application of ammonia to soil comprising, in combination, a wheeled vehicle adapted to travel along the ground, a cultivator shoe attached to said vehicle, said shoe being adapted at its lower extremity to produce a furrow in the ground as the vehicle is moved forward, a liquid ammonia storage tank rigidly mounted on said vehicle, a normally closed diaphragm operated valve assembly having a fluid inlet connection and a fluid outlet connection and a flexible diaphragm, a valve seat in and concentric with said fluid inlet connection, a conduit attached to said fluid inlet connection and leading from said ammonia storage tank, a valve having a head and a stem, said valve being disposed in operable relation with and concentric with said seat and said inlet connection, the stem of said valve being operatively attached to said diaphragm for imparting movement to the valve head, a tube leading from the outlet connection of said valve to a point near the lower extremity of said shoe for applying ammonia to the soil, said outlet connection having an orifice, an oil storage reservoir and an oil pump mounted on said vehicle, a conduit leading from said oil storage reservoir to the inlet side of said pump, a conduit leading from the pressure outlet side of said pump to the diaphragm valve assembly on the side of the diaphragm opposite the valve stem, said diaphragm being adapted to open said valve upon a predetermined oil pressure from said pump, a power take-off on said vehicle for operating said pump when the vehicle is moving in a forward direction, and an oil return line from the diaphragm valve assembly on the side of the diaphragm opposite said valve stem to the oil storage reservoir.

5. An implement-mounted dispensing system for the direct application of ammonia to soil comprising, in combination, a wheeled vehicle adapted to travel along the ground, a cultivator shoe attached to said vehicle, said shoe being adapted at its lower extremity to produce a furrow in the ground as the vehicle is moved forward, a liquid ammonia storage tank rigidly mounted on said vehicle, a normally closed diaphragm operated valve assembly having a housing and a fluid inlet connection and an outlet connection at one end of said housing, a valve seat in and concentric with said fluid inlet connection, a conduit attached to said fluid inlet connection and leading from said ammonia storage tank, a valve having a head and a stem, said valve being disposed in operable relation with said seat, a plane and rigid partition disposed within said housing closer to the valve end than to the other end, the plane of said partition being normal to the axis of the stem of said valve, an opening in said partition, said valve stem extending through said opening, a packing gland assembly disposed in said opening and fixed in a rigid and gas-tight manner to said partition and operatively around said valve stem, a flexible diaphragm in said housing normal to the axis of said valve stem, said valve stem being operatively attached to said diaphragm, said diaphragm being disposed closer to the other end of said housing than to the valve end, a pair of pipe connections in the other end of said housing, an oil containing reservoir and an oil pressure pump mounted on said vehicle, a conduit leading from said reservoir to the inlet of said pump, a conduit leading from the outlet of said pump to one pipe connection of said pair of pipe connections, a conduit leading from the other of said pair of pipe connections to said reservoir, a power take-off mounted on said vehicle, said power take-off being adapted to operate said oil pressure pump to open said valve when the vehicle is moving in a forward direction.

References Cited in the file of this patent

UNITED STATES PATENTS

| Number | Name | Date |
|---|---|---|
| 1,038,084 | Carroll | Sept. 10, 1912 |
| 2,076,566 | Isbell | Apr. 13, 1937 |
| 2,475,686 | Anderson | July 12, 1949 |
| 2,594,284 | Blue | Apr. 29, 1952 |

OTHER REFERENCES

Agricultural Engineering for September 1947 (pages 394-396—"Machinery for Applying Anhydrous Ammonia to the Soil").